US012008105B2

(12) United States Patent
Herren et al.

(10) Patent No.: US 12,008,105 B2
(45) Date of Patent: Jun. 11, 2024

(54) PROTECTED QR CODE SCANNER USING OPERATIONAL SYSTEM OVERRIDE

(71) Applicant: Bank of America Corporation, Charlotte, NC (US)

(72) Inventors: Taylor Herren, Addison, TX (US); Ryan Frances Muzzo, Saint Charles, IL (US); Frank J. Yanan, Wheaton, IL (US); Eric Emanuelson, Pinecrest, FL (US); Adam Desautels, Charlotte, NC (US); Sara Roper, Denver, CO (US)

(73) Assignee: Bank of America Corporation, Charlotte, NC (US)

( * ) Notice: Subject to any disclaimer, the term of this patent is extended or adjusted under 35 U.S.C. 154(b) by 157 days.

(21) Appl. No.: 17/834,179

(22) Filed: Jun. 7, 2022

(65) Prior Publication Data
US 2023/0394151 A1  Dec. 7, 2023

(51) Int. Cl.
*G06F 21/57* (2013.01)
*G06F 21/51* (2013.01)
*G06F 21/53* (2013.01)

(52) U.S. Cl.
CPC .............. *G06F 21/57* (2013.01); *G06F 21/51* (2013.01); *G06F 21/53* (2013.01); *G06F 2221/2119* (2013.01)

(58) Field of Classification Search
CPC .......... G06Q 20/3274; G06Q 20/3276; H04M 2017/2537; G06F 21/57; G06F 21/51; G06F 21/53; G06F 2221/2119
See application file for complete search history.

(56) References Cited

U.S. PATENT DOCUMENTS

2016/0323107 A1 * 11/2016 Bhogal ................. H04W 12/10
2020/0226617 A1    7/2020 Meadow

FOREIGN PATENT DOCUMENTS

| KR | 101115250 B1 * | 2/2012 | ............. G06F 9/455 |
| WO | WO-2015008144 A2 * | 1/2015 | ....... G06F 17/30879 |
| WO | WO-2016082695 A1 * | 6/2016 | ............. H04L 29/06 |

OTHER PUBLICATIONS

"What is a Sandbox," https://www.proofpoint.com/au/threat-reference/sandbox, Proofpoint, Retrieved on May 4, 2022.

* cited by examiner

*Primary Examiner* — Trong H Nguyen
(74) *Attorney, Agent, or Firm* — Weiss & Arons LLP

(57) ABSTRACT

Apparatus and methods for root-level enforcement of quick response ("QR") code validation are provided. The apparatus may include a QR code reader for receiving an instruction from a user to scan a QR code and transmitting a request to an operating system ("OS") running on the apparatus to instruct a camera to capture an image. The apparatus may include an operating system configured to receive the image from the camera and store the image in a temporary cache. While the image is stored in the temporary cache, the operating system may transmit the image to a QR code validator to decode a QR code included in the image and execute a routine to validate a URL included in the QR code. The image may only be transmitted back to the QR code reader by the OS when the URL was validated by the routine.

18 Claims, 6 Drawing Sheets

PROTECTED QR CODE SCANNER USING OPERATIONAL SYSTEM OVERRIDE

FIELD OF TECHNOLOGY

Aspects of the disclosure relate to quick response ("QR") codes. In particular, aspects of the disclosure relate to securing data accessed in response to scanning QR codes.

BACKGROUND

Quick response ("QR") codes are used for many different purposes. QR codes may be found on advertisements, billboards and digital ads displayed on digital devices. QR codes may be found on tags of purchase items. QR codes may also be found within articles and other documents to enable retrieval of additional data. QR codes may assist in a quicker payment process when purchasing an item. Additionally, QR codes enable providing additional data regarding the purchase item.

Because of the nearly ubiquitous usage of QR codes, malicious activity involving QR codes has become prevalent. For example, hackers embed QR codes with malicious URLs. Additionally, hackers replace legitimate QR codes with compromised QR codes.

When a user scans a QR code that is malicious and/or is linked to a malicious URL, this may compromise the user's data stored on the user's mobile device. Additionally, this may compromise online applications associated with the user.

It would be desirable, therefore, to provide systems and methods to protect a user's device and data against malicious QR codes by safely identifying secure and/or non-secure QR codes.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
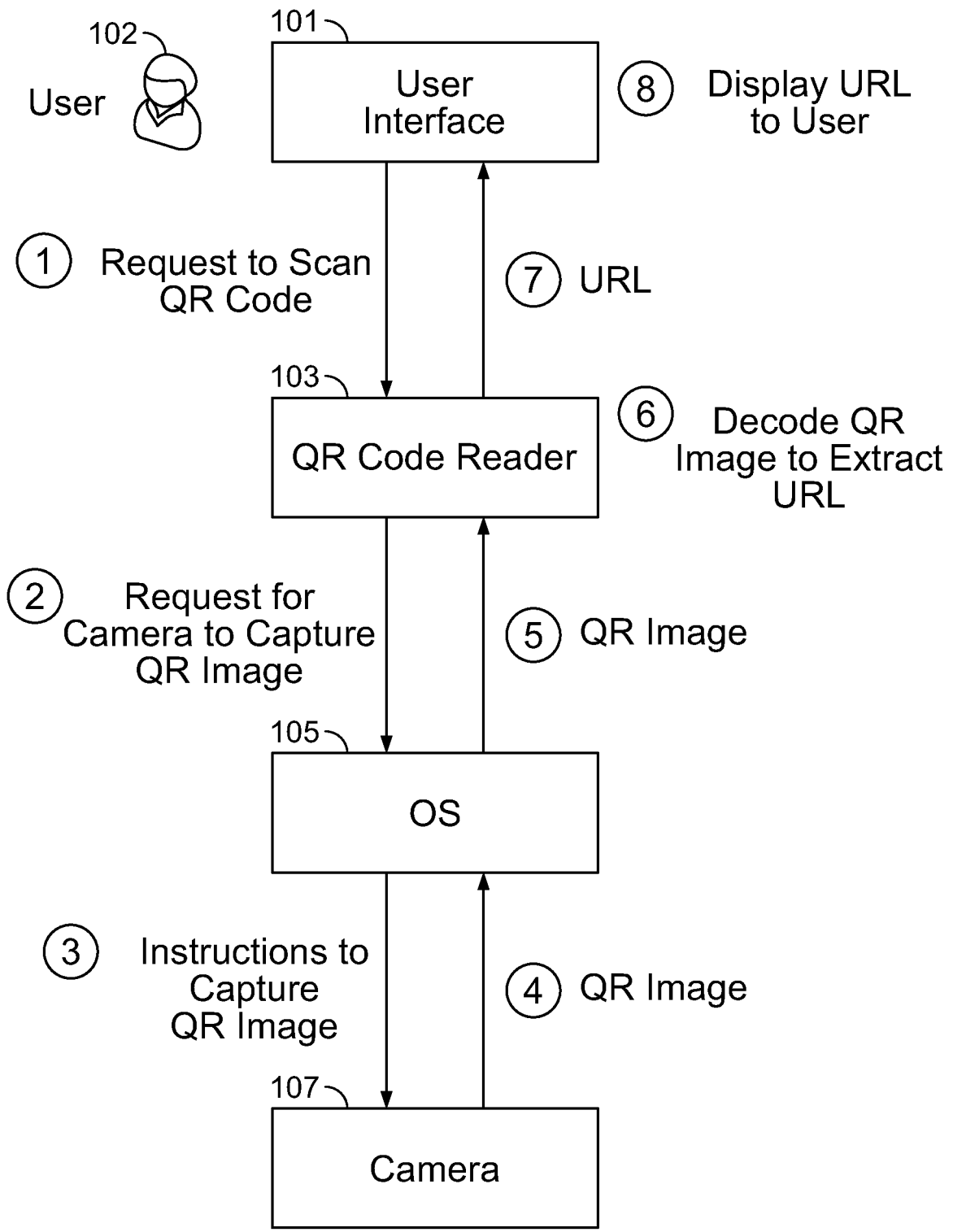
FIG. 1 shows illustrative apparatus and methods in accordance with the invention.

Apparatus and methods for safely identifying secure QR codes is provided. The apparatus and methods may include a system. The system may be implemented on a mobile device. The mobile device may be a smartphone, computer, or any other suitable mobile device. The system may be implemented on any suitable computer or computing system. Reference made to a mobile device herein is to be understood to include, in the alternative, any system described above.

The systems and methods of the invention may include the mobile device. The mobile device in accordance with the invention may comprise apparatus, and implement systems and methods described herein, to ensure that malicious URLs encoded in QR codes scanned by the mobile device are not accessed. The systems and methods may use root-level enforcement to ensure that malicious URLs embedded in QR codes scanned by the mobile device are not accessed. In exemplary embodiments, an operating system ("OS") running on the mobile device may enforce at least a portion systems and methods described herein.

The mobile device may include some or all of a QR code reader, the OS, and a QR code validator. A first application may run the QR code reader. A second application may run the QR code validator. The operating system may run on the mobile device and support root-level functionality of the mobile device. The QR code reader may run on a first interface supported by the mobile device. The QR code validator may run on a second interface supported by the mobile device. One or both of the QR code reader and/or the QR code validator may be run on software stored on the mobile device or, alternately, run on software accessed through the internet.

In some embodiments, the QR code validator may be an application separate from the QR code reader. In some of these embodiments, data accessed by the QR code validator may not be accessible to the QR code reader. The QR code validator may or may not support electronic communication with the browser. The QR code validator may support internet connection separate from the user-accessible browser.

The QR code reader may be configured to receive an instruction from a user to scan a QR code. The QR code reader may be further configured to decode an image of a QR code to identify a URL stored in the QR code. The QR code reader may also be configured to instruct a browser running on the mobile device to access a webpage via the URL stored in a QR codes.

The QR code reader, upon receipt of the instruction from the user, may transmit a request to the OS running on the mobile device to instruct a camera to capture an image. The image may include the QR code.

The OS may be configured to route the request to the camera. The camera may be a piece of hardware embedded on the mobile device. The camera may capture the image. The camera may transmit the image to the OS. The OS may receive the image from the camera.

The OS may not route the image received from the camera to the QR code reader which requested the image. Instead, the OS may store the image in a database. The database may be cache. The database may be a temporary cache.

After, or, in parallel to, the storing the image in the database, the OS may transmit a copy of the image to a QR code validator. The QR code validator may be configured to receive the image. In response to receipt of the image, the QR code validator may decode the QR code to identify a URL. The QR code validator may then execute a validation routine to validate the URL.

While the image is stored in the database, the QR code reader may not have access to the image. As such, the QR code reader may not be able to decode the QR code included in the image and instruct a browser running on the mobile device to access a URL encoded in the URL.

The validation routine may include running a first query on a pre-trusted QR code database to determine if the pre-trusted QR code database stores the URL. The pre-trusted QR code database may store a list of URLs that are known to be safe to access. In response to the first query identifying the URL in the pre-trusted QR code database, the validation routine may include validating the URL.

In response to the first query not identifying the URL in the pre-trusted QR code database and, in response, returning a null value, the validation routine may include running a second query on a suspicious URL database to determine if the suspicious URL database stores the URL. The suspicious URL database may store a list of URLs known to be unsafe. In response to the second query identifying the URL, the validation routine may include failing to validate the URL. For the purposes of the application, failing to validate a URL is to be understood to mean determining that the URL is unsafe to access. In response to the second query failing to identify the URL in the suspicious URL database, the validation routine may include accessing a webpage identified by the URL in a sandbox environment.

The first query may be run in parallel with the second query. The first query may be run before or after the second query.

The accessing the webpage in the sandbox environment may include running the webpage in the sandbox environment. The sandbox environment may be a computing environment where it is safe to run a possibly harmful or malicious website because of the isolation of the sandbox environment from the remaining functionalities of the mobile device. The accessing the webpage in the sandbox environment may include searching the webpage, or searching actions executed by the webpage, in the sandbox environment, for one or more scripting errors, requests for information, improper scripting and/or redirection commands. The accessing the webpage in the sandbox environment may additionally or alternately include one or more of searching for content and/or files including data identified as suspicious in a QR code validator database, searching for a URL security certificate, accessing an age of the URL, determining if the URL runs code prompting a redirect, searching for phishing domains, spoofed domains and/or spoofed branding, etc. The results of executing one or more of the aforementioned actions may be used alone or in combination to validate or to fail to validate the URL.

The validation routine may include validating the URL in response to the sandbox environment failing to identify one or more scripting errors, requests for information, improper scripting and redirection commands. The validation routine may include failing to validate the URL in response to the sandbox environment identifying at least one scripting error, requests for information, improper script and redirection command. Any other information described above may be used to validate or fail to validate the URL.

In response to the validation routine validating the URL, the QR code validator may transmit a first message to the OS. The first message may be a validation message. The first message may include the URL. In embodiments where the OS does not store the image in a database, the first message may include the image. In response to the validation routine failing to validate the URL, the QR code validator may transmit a second message to the OS. The second message may be an error message or any other suitable message.

The OS, in response to receipt of the first message, may be configured to retrieve the image from the temporary cache and transmit the image to the QR code reader. The QR code reader, in response to receipt of the image from the QR code validator, may decode the QR code and instructing the browser to access the URL. When the first message includes the URL, the OS may transmit the URL to the QR code reader. The QR code reader, in response to receipt of the URL, may instruct the browser to access the URL.

The OS, in response to receipt of the second message, may purge the image from the database. The OS may transmit to the QR code reader a third message. The third message may not include the image and/or the URL. The third message may be an error message. In response to receipt of the third message, the QR code reader may display an error message to the user.

It follows that the systems and methods implemented by the mobile phone, including the routing of the image, by the OS, from the camera to the QR code validator and not the QR code reader, ensures that the QR code reader will only instruct the browser to access URLs validated by the validation routine. This is at least because the OS intercepts transmission of the image from the camera to the QR code reader at the root level, and will only release the image or the URL encoded in the image to the QR code scanner after the URL has been validated by the validation routine.

In some embodiments, after the validating of the URL by the validation routine and the transmitting of the image from the OS database to the QR code reader, the OS may be configured to trigger a web beacon to track browser activity on the mobile device for a time period. The web beacon may be configured to ensure that the URL, if accessed by the user, is safe. This may function as a second validation layer after the first validation layer of the running of the validation routine via the QR code validator.

The web beacon, when triggered, may be configured to track browser activity on the mobile device to identify when the URL is accessed. In response to identifying that the URL has been accessed, the web beacon may begin monitoring a website accessed via the URL for anomalous behavior. The anomalous behavior may include a request for access generated by the website, a data request for device data of the mobile device, a redirect command, or any other suspicious action.

In response to identifying the website executing one or more suspicious actions, the web beacon may instruct the browser to shut down the URL. The web beacon may then transmit the URL to the QR code validator. The QR code validator may add the URL to the suspicious URL database. The suspicious URL database may be stored on a cloud. In some embodiments, the scanned QR code may be associated with a GPS location of the mobile device when the QR code was scanned. If the suspicious URL database identifies multiple uploads of the suspicious QR code within a similar location, law enforcement may be notified of the specific or general location where the suspicious QR code was scanned.

The web beacon, after being triggered, may automatically deactivate upon a lapse of the time period. This may be based on the '80/20' rule that if no suspicious activity was identified during the time period, it is unlikely that suspicious activity will occur at all. The time period may be any suitable time period, such as 1 minute, 2 minutes, 5 minutes, 10 minutes, or any other suitable time period.

In some embodiments, the OS may only store the image in the temporary cache when the user is logged into one or more secure applications on the mobile device. For example, when the user is logged into an online banking account, or any other application storing sensitive information, the OS may hold the image in the temporary cache pending validation by the QR code validator as described above. However, when the user is not logged into the secure application, the OS may transmit the image captured by the camera back to the QR code scanner without any intervention. It follows that that OS may determine whether or not the user is logged into one or more secure applications and, based on the determination, either route the image to the QR code validator or the QR code scanner.

In some embodiments, the OS may only store the image in the temporary cache when a user logged into the mobile device has certain administrative credentials. For example, an employee status may be used to determine whether or not to route an image captured in response to request from a QR code scanner directly back to the QR code scanner, or, instead, if the image should be held in the temporary cache pending validation by the QR code validator.

The systems and methods of the invention may include the system. The system may be the mobile device. The system may apply root-level enforcement of quick response ("QR") code validation. The system may include the QR code reader, the OS and the QR code reader. Each of the aforementioned apparatus may perform and support methods and functionalities described herein. Methods performed by the mobile device described above may be combined with methods described below as being performed by the system.

The QR code reader may receive an instruction from a user to scan an image. The QR code reader may transmit a request to the OS running on the system to instruct a camera to capture the image. The OS may route the request to the camera and receive the image from the camera.

The OS, after receiving the image from the camera, may run an image identification routine on the image to determine if the image includes a QR code. The OS may transmit the image to a machine-learning application trained to identify QR codes to determine if the image includes a QR code.

In response to the image identification routine failing to identify a QR code, the OS may transmit the image to the QR code reader. If the image is determined not to include a QR code, the OS may not store the image in the temporary cache.

In response to the image identification routine identifying a QR code, the OS may store the image in the temporary cache. The OS may transmit the image to the QR code validator. The QR code validator, in response to receipt of the image, may decode the QR code to identify a URL. The QR code validator may execute the validation routine to validate the URL. The validation routine may include one or more of the steps described herein.

In response to the validation routine validating the URL, the QR code validator may transmit the first message, which may include the URL, to the OS. In response to the validation routine failing to validate the URL, the QR code validator may transmit the second message to the OS. The OS may transmit the image to the QR code reader only in response to receipt of the validation message. In some embodiments, in response to receipt of the validation message, the OS may also transmit the URL to the QR code reader. The QR code reader, in response to receipt of the image from the QR code validator, may instruct the browser to access the URL.

The OS, in response to receipt of the error message, may purge the image from the temporary cache and transmit to the QR code reader the third message. The third message may not include the image or the URL. The QR code reader, in response to receipt of the third message, may display an error message to the user. The error message may inform the user, on a graphical user interface of the system, that the URL encoded in the QR code that the user desires to access is unsafe and cannot be accessed by a browser run by the system.

The systems and methods of the invention may include one or more non-transitory computer-readable media storing computer-executable instructions which, when executed by a processor on a computer system, perform methods for root-level enforcement of quick response ("QR") code validation described herein. The computing system may be the system. The computing system may be the mobile device. The methods may include steps and functions described herein in reference to the mobile device and/or the system. The methods may be performed by the QR code reader, the OS, the QR code validator, the web browser and/or the web beacon.

The methods may include, at a first interface comprising the QR code reader, receiving an instruction from a user to scan a QR code. The methods may also include transmitting a request to the OS running on the computing system to instruct a camera to capture an image including the QR code.

The methods may include the OS routing the request to the camera, receiving the image from the camera, storing the image in the temporary cache, and transmitting the image to the QR code validator. The methods may include, at the second interface comprising the QR code validator, and in response to receipt of the image, decoding the QR code to identify the URL and executing the validation routine described herein to validate the URL. In response to the validation routine validating the URL, the methods may include the QR code validator transmitting the first message to the OS and, in response to the validation routine failing to validate the URL, the methods may include the QR code validator transmitting the second message to the OS.

The first interface may be an application separate from the second interface. Data accessible to the first interface may not be accessible by the second interface.

The methods may include the OS, in response to receipt of the first message, retrieving the image from the temporary cache and transmitting the image to the QR code reader. The methods may include, in response to receipt of the second message, the OS purging the image from the temporary cache and returning to the QR code reader a third message not including the image.

The methods may include, at the first interface comprising the QR code reader, in response to receipt of the image from the QR code validator, decoding the QR code and instructing the browser access the URL. The methods may include the QR code reader, in response to receipt of the third message, displaying an error message to the user.

In some embodiments, the methods may include, after the transmitting of the image to the QR code reader, the OS triggering the web beacon to track browser activity on the mobile device for the time period. The web beacon may perform tracking actions described herein.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or programs or by utilizing computer-readable data structures.

FIG. 1 shows illustrative apparatus and methods in accordance with the invention. At step 1, user 102 may input a request to scan a QR code into user interface 101 of a mobile device. The request may be received by QR code reader 103. QR code reader 103, at step 2, may transmit to OS 105 a request for camera 107 to capture a QR image. The QR image may be an image including a QR code that encodes a URL. At step 3, OS 105 may instruct camera 107 to capture the QR image. At step 4, camera 107 may capture the QR image and transmit the QR image to OS 105. At step 5, OS 105 may transmit the QR image to QR code reader 103. At step 6, QR code reader 103 may decode the QR code included in the QR image to extract the URL. At step 7, QR code reader may transmit the URL to a browser being run on user interface 101. At step 8, user interface 101 may display the URL to user 102 in the browser.

OS 105 may transmit QR image directly to QR code reader 103 without first initiating the running of the validation routine on the QR image because one or more of the following conditions were met: the QR image does not include a QR code, as determined by image processing described herein, user 102 does not have employee permissions that require the running of the validation routine on the QR image, and/or user 102 is not presently logged into a secure application. Each of the aforementioned conditions are described herein.

Figure 2:
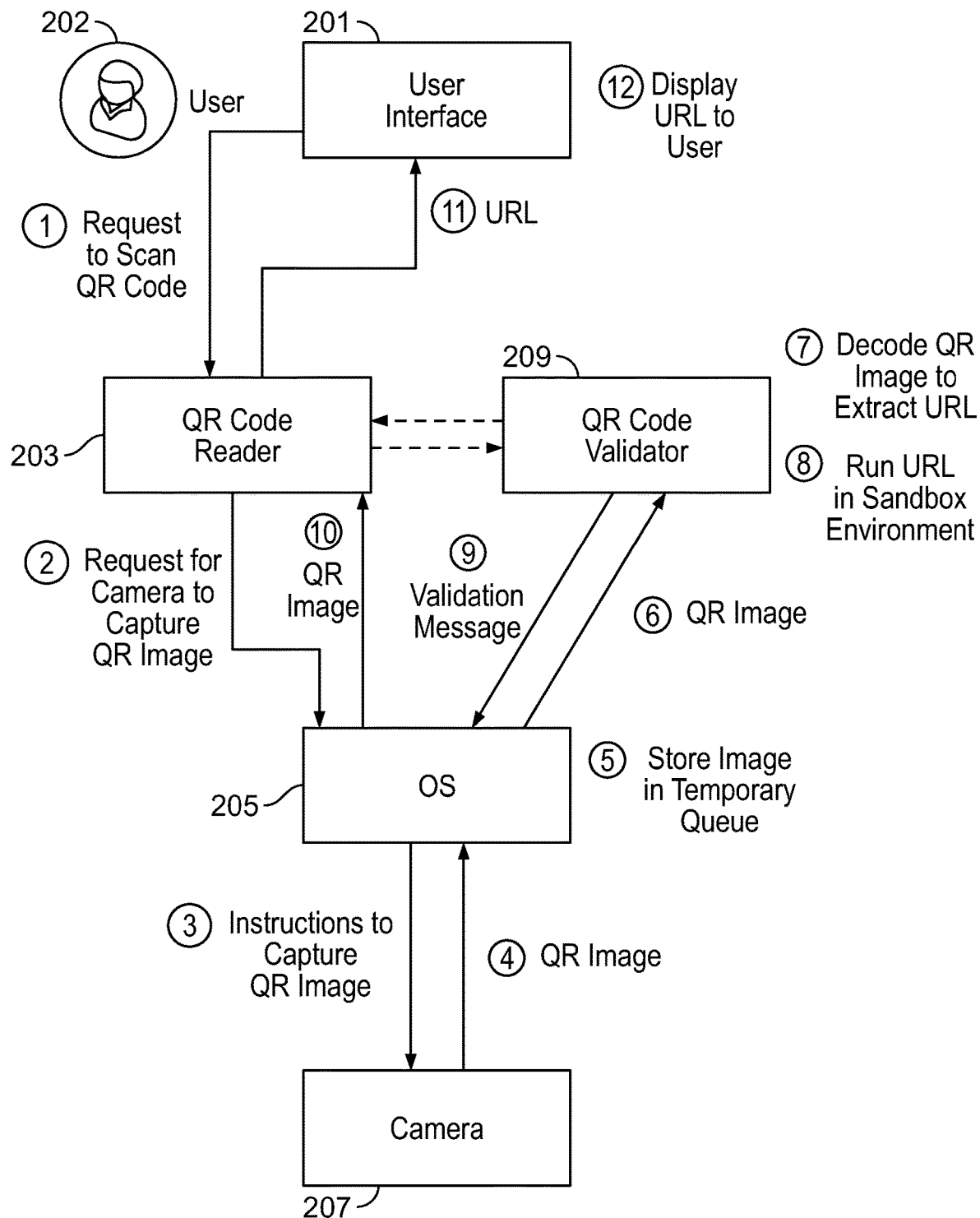
FIG. 2 shows illustrative apparatus and methods in accordance with the invention.

FIG. 2 shows illustrative apparatus and methods in accordance with the invention. At step 1, user 202 may input a request to scan a QR code into user interface 201 of a mobile device. The request may be received by QR code reader 203. QR code reader 203, at step 2, may transmit to OS 205 a request for camera 207 to capture a QR image. The QR image may be an image including a QR code. At step 3, OS 205 may instruct camera 207 to capture the QR image. At step 4, camera 207 may capture the QR image and transmit the QR image to OS 205. At step 5, OS 205 may store the QR image in a temporary queue. The temporary queue may be the temporary cache. At step 6, OS 205 may transmit the QR image to QR code validator 209. At step 7, QR code validator 209 may decode the QR code included in the QR image to extract a URL. At step 8, QR code validator 209 may execute the validation routine described herein on the URL. The validation routine may include running the URL in the sandbox environment.

At step 9, QR code validator 209 may transmit a validation message to OS 205. The transmission of the validation message may be in response to the validation routine validating the URL. In response to receipt of the validation message, at step 10, OS 205 may transmit QR image to QR code reader 203. At step 11, QR code reader 203 may transmit the URL to a browser being run on user interface 201. At step 12, user interface 201 may display the URL to user 202 on the browser. In some embodiments, the web beacon may be simultaneously activated by OS 205 to track the behavior of the URL for the time period to ensure that the URL is a safe website and does not exhibit suspicious behavior.

Figure 3:
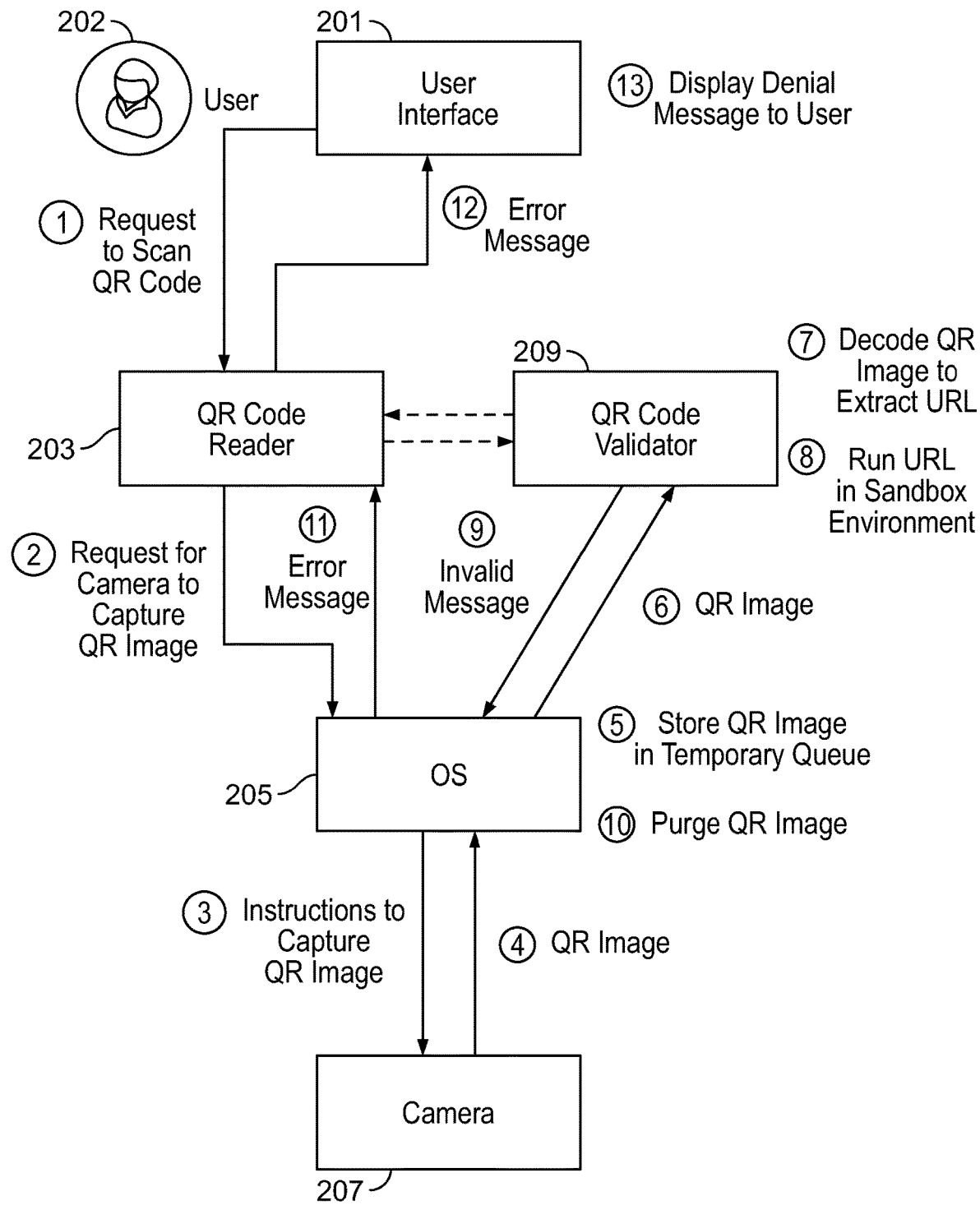
FIG. 3 shows illustrative apparatus and methods in accordance with the invention.

FIG. 3 shows illustrative apparatus and methods in accordance with the invention. FIG. 3 may include apparatus illustrated in FIG. 2. FIG. 3 may include steps 1-8 described above in connection to FIG. 2.

At step 9, QR code validator may transmit an invalid message to OS 205. The invalid message may be the error message. In response to receipt of the error message, at step 10, OS 205 may purge the QR image stored in the temporary queue. At step 11, OS 205 may transmit an error message to QR code reader 203. At step 12, QR code reader 203 may transmit an error message to user interface 201. At step 13, user interface 201 may display a denial message to user 202.

Figure 4:
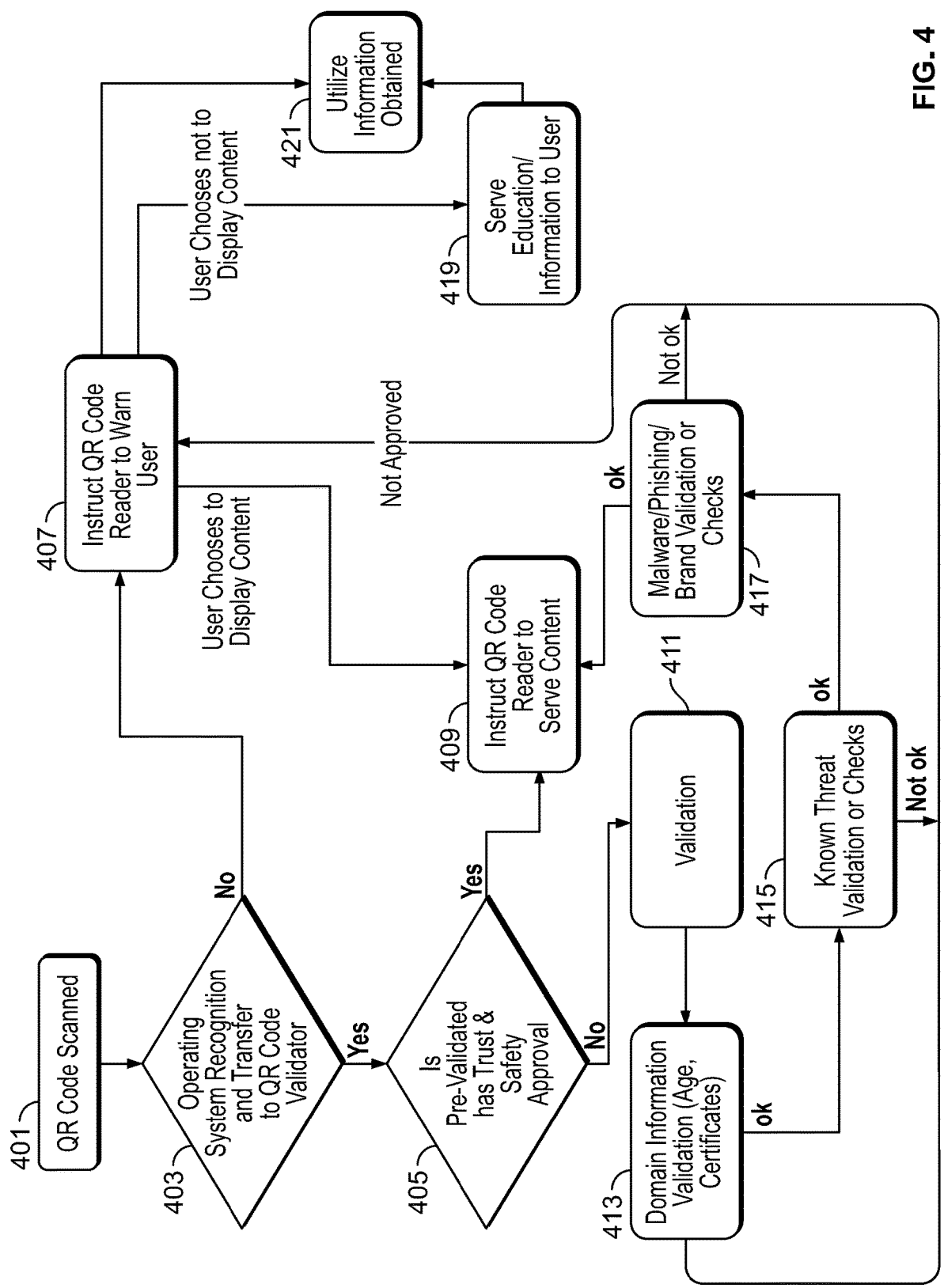
FIG. 4 shows an illustrative method in accordance with the invention.

FIG. 4 shows an illustrative method in accordance with the invention. At step 401, a QR code may be scanned. At step 403, an OS may recognize that the scanned image includes a QR code. The OS may transmit the image to the QR code validator. At step 405, the QR code validator may execute a determination to determine if a URL included in the QR code is pre-validated and has a trust and safety approval. This determination may include running a query on the pre-trusted QR code database. If the query identifies the URL in the pre-trusted QR code database, the method may continue at step 409. At step 409, the QR code validator may instruct the QR code reader to serve the content of the URL—i.e. the website—to the user via a browser being run on the system.

If the query does not identify the URL in the pre-trusted QR code database, the method may continue at step 411. At step 411, the validation routine may proceed. The routine may proceed at step 413, including searching the URL for domain information, such as the age of the domain and domain security certificates. This data may be used to determine if the domain is a valid—i.e. secure—domain. If the domain information points to the domain being valid—for example, that the domain is at least 6 months old and has a security certificate—the validation routine may continue at step 415. At step 415, the validation routine may include searching the URL for known suspicious data, such as improper spelling, spoofed identifies, and improper scripting. If the URL is found not to include suspicious data, the validation routine may continue at step 417. At step 417, the validation routine may include determining if the URL runs any malware or phishing routines. This may include identifying if the URL executes a script requesting user data, user device data, a redirect request, or any other malware or phishing routine. If the validation routine determines that no malware or phishing routines are being run by the URL, the method may continue at step 409, described above.

If the validation routine determines, at step 413, that the domain information of the URL points to a suspicious URL—e.g. the URL was created within the past week and/or the URL does not have a certificate, the method may proceed at step 407. If the validation routine determines, at step 415, that the URL includes known suspicious data, the method may proceed at step 407. If the validation routine determines, at step 417, that the URL runs malware or phishing routines, the method may proceed at step 407.

Step 407 may include the QR code reader warning a user not to access the URL. In other embodiments, step 407 may include the OS purging the image of the QR code stored in the temporary queue and returning an error message to the QR code reader. As such, the user will be presented with an error message, and will not be given the option to view the URL even if the user wants to do so.

When step 407 includes warning the user, the method may include, at step 419, displaying educational information to the user about security advantages for opting not to access the URL. When step 407 includes warning the user, the method may include, at step 412, the user selecting, nonetheless, to access the URL. In these embodiments, the methods may include, at step 412, the user utilizing information obtained from the URL.

Figure 5:
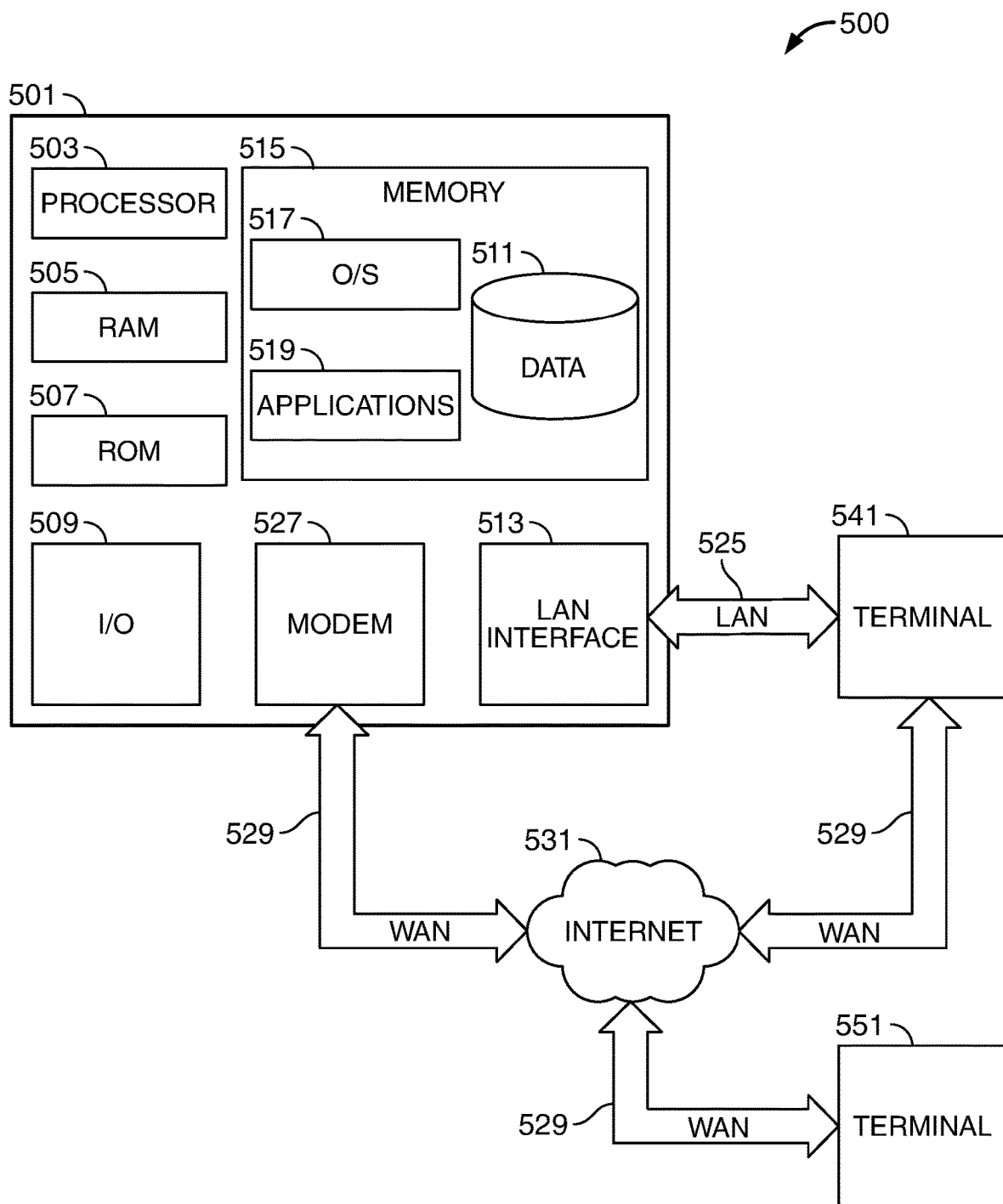
FIG. 5 shows an illustrative block diagram of apparatus in accordance with the invention.

FIG. 5 shows an illustrative block diagram of system 500 that includes computer 501. Computer 501 may alternatively be referred to herein as a "system," "engine," "server" or a "computing device." Computer 501 may be a workstation, desktop, laptop, tablet, smart phone, mobile device, or any other suitable computing device. Elements of system 500, including computer 501, may be used to implement various aspects of the systems and methods disclosed herein. Apparatus described herein, including the system, the mobile device, and, additionally, the QR code scanner, the OS, the web beacon, and the QR code validator, may include some or all of the elements and apparatus of system 500.

Computer 501 may have a processor 503 for controlling the operation of the device and its associated components, and may include RAM 505, ROM 507, input/output circuit 509, and a non-transitory or non-volatile memory 515. Machine-readable memory may be configured to store information in machine-readable data structures. The processor 503 may also execute all software running on the computer—e.g., the operating system and/or voice recognition software. Other components commonly used for computers, such as EEPROM or Flash memory or any other suitable components, may also be part of the computer 501.

The memory 515 may be comprised of any suitable permanent storage technology—e.g., a hard drive. The memory 515 may store software including the operating system 517 and application(s) 519 along with any data 511 needed for the operation of computer 501. Memory 515 may also store videos, text, and/or audio assistance files. The data stored in Memory 515 may also be stored in a database, a temporary cache, or any other suitable memory.

Input/output ("I/O") module 509 may include connectivity to a microphone, keyboard, touch screen, mouse, and/or stylus through which input may be provided into computer 501. The input may include input relating to cursor movement. The input/output module may also include one or more speakers for providing audio output and a video display device for providing textual, audio, audiovisual, and/or graphical output. The input and output may be related to computer application functionality. The input may be input by the user.

Computer 501 may be connected to other systems via a local area network (LAN) interface 513. Computer 501 may operate in a networked environment supporting connections to one or more remote computers, such as terminals 541 and 551. Terminals 541 and 551 may be personal computers or servers that include many or all of the elements described above relative to computer 501. The network connections depicted in FIG. 5 include a local area network (LAN) 525 and a wide area network (WAN) 529, but may also include other networks. When used in a LAN networking environment, computer 501 is connected to LAN 525 through a LAN interface 513 or an adapter. When used in a WAN networking environment, computer 501 may include a modem 527 or other means for establishing communications over WAN 529, such as Internet 531. Connections between Computer 501 and Terminals 551 and/or 541 may be used for connections between firewall filter 117 and one or more of process 119, system configuration 123 and process 121.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 519, which may be used by computer 501, may include computer executable instructions for invoking functionality related to communication, such as e-mail, Short Message Service (SMS), and voice input and speech recognition applications. Application program(s) 519 (which may be alternatively referred to herein as "plugins," "applications," or "apps") may include computer executable instructions for invoking functionality related to performing various tasks. Application programs 519 may utilize one or more algorithms that process received executable instructions, perform power management routines or other suitable tasks. Application programs 519 may utilize one or more decisioning processes used by one or both of the QR code validator and/or the OS.

Application program(s) 519 may include computer executable instructions (alternatively referred to as "programs"). The computer executable instructions may be embodied in hardware or firmware (not shown). The computer 501 may execute the instructions embodied by the application program(s) 519 to perform various functions.

Application program(s) 519 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 511, and any other suitable information, may be stored in memory 515. One or more of applications 519 may include one or more algorithms that may be used execute the validation routine, the image identification routine, and/or the web beacon as described herein.

The invention may be described in the context of computer-executable instructions, such as applications 519, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 501 and/or terminals 541 and 551 may also include various other components, such as a battery, speaker, and/or antennas (not shown). Components of computer 501 may be linked by a system bus, wirelessly or by other suitable interconnections. Components of computer 501 may be present on one or more circuit boards. In some embodiments, the components may be integrated into a single chip. The chip may be silicon-based.

Terminal 551 and/or terminal 541 may be portable devices such as a laptop, cell phone, Blackberry™, tablet, smartphone, or any other computing system for receiving, storing, transmitting and/or displaying relevant information. Terminal 551 and/or terminal 541 may be one or more user devices. Terminals 551 and 541 may be identical to computer 501 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 6:
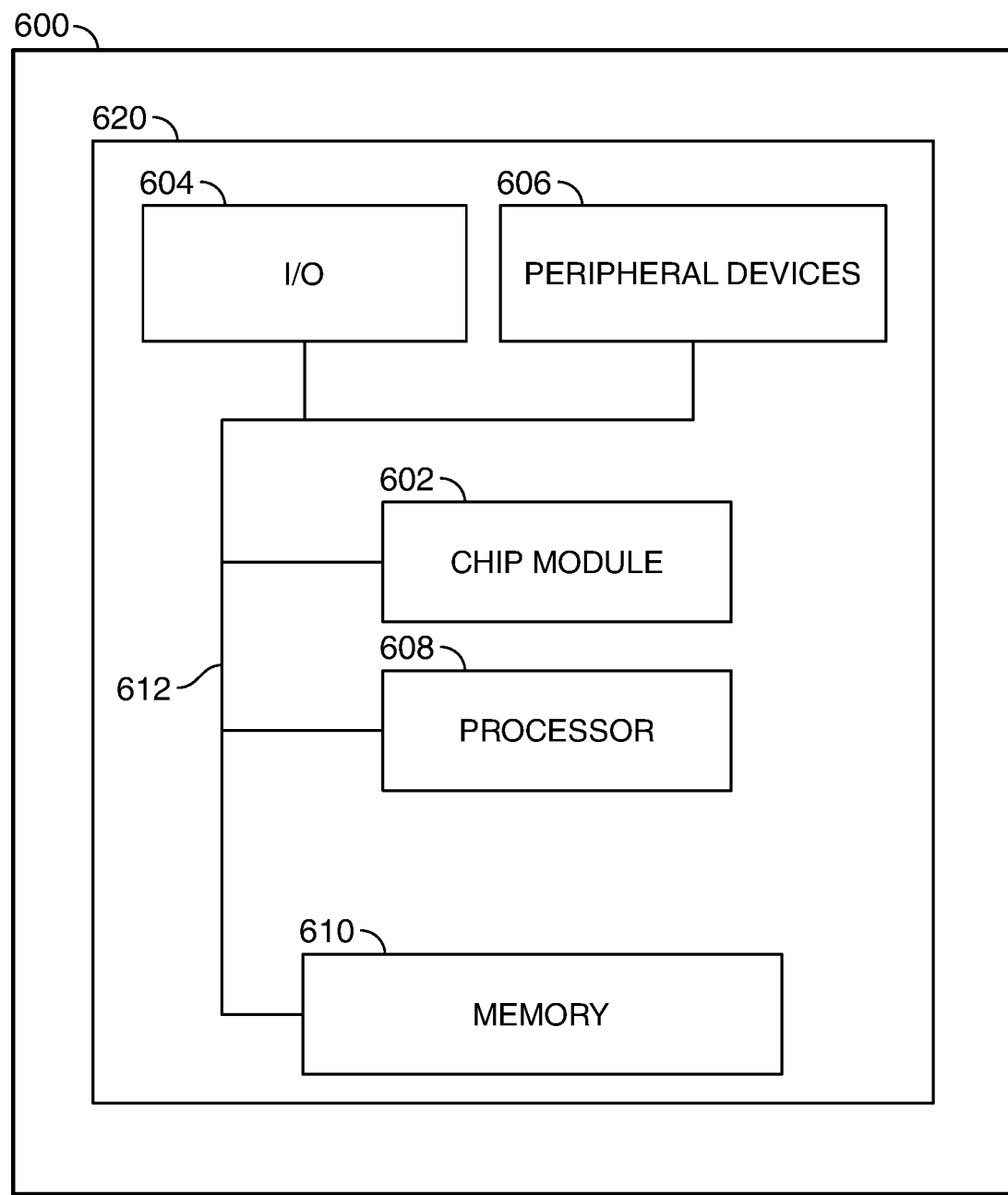
FIG. 6 shows illustrative apparatus that may be configured in accordance with the invention.

FIG. 6 shows illustrative apparatus 600 that may be configured in accordance with the principles of the disclosure. Apparatus 600 may be a computing device. Apparatus 600 may include one or more features of the apparatus shown in FIG. 5. Apparatus 600 may include chip module 602, which may include one or more integrated circuits, and which may include logic configured to perform any other suitable logical operations.

Apparatus 600 may include one or more of the following components: I/O circuitry 604, which may include a transmitter device and a receiver device and may interface with fiber optic cable, coaxial cable, telephone lines, wireless devices, PHY layer hardware, a keypad/display control device or any other suitable media or devices; peripheral devices 606, which may include counter timers, real-time timers, power-on reset generators or any other suitable peripheral devices; logical processing device 608, which may compute data structural information and structural parameters of the data; and machine-readable memory 610.

Machine-readable memory 610 may be configured to store in machine-readable data structures: machine executable instructions, (which may be alternatively referred to herein as "computer instructions" or "computer code"), applications such as applications 519, signals, and/or any other suitable information or data structures.

Components 602, 604, 606, 608 and 610 may be coupled together by a system bus or other interconnections 612 and may be present on one or more circuit boards such as circuit board 620. In some embodiments, the components may be integrated into a single chip. The chip may be silicon-based.

Thus, systems and methods for secure QR code scanning are provided. Persons skilled in the art will appreciate that the present invention can be practiced by other than the described embodiments, which are presented for purposes of illustration rather than of limitation.

What is claimed is:

1. A mobile device that applies root-level enforcement of quick response ("QR") code validation, the mobile device comprising:
    a QR code reader configured to decode QR codes and instruct a browser running on the mobile device to access webpages identified in the QR codes, the QR code reader for:
        receiving an instruction from a user to scan a QR code; and
        transmitting a request to an operating system ("OS") running on the mobile device to instruct a camera to capture an image including the QR code;
    the OS for:
        routing the request to the camera;
        receiving the image from the camera;
        storing the image in a temporary cache; and
        transmitting the image to a QR code validator;
    the QR code validator for:
        in response to receipt of the image, decoding the QR code to identify a URL;
        executing a validation routine to validate the URL;
        in response to the validation routine validating the URL, transmitting a first message to the OS; and
        in response to the validation routine failing to validate the URL, transmitting a second message to the OS;
    the OS for:
        in response to receipt of the first message, retrieving the image from the temporary cache and transmitting the image to the QR code reader; and
        in response to receipt of the second message, purging the image from the temporary cache and returning to the QR code reader a third message not including the image; and
    the QR code reader for:
        in response to receipt of the image from the OS, decoding the QR code and instructing a browser to access the URL; and
        in response to receipt of the third message, displaying an error message to the user;
    wherein:
        the transmitting of the image, by the OS, from the camera to the QR code validator and not the QR code reader ensures that the QR code reader will only instruct the browser to access URLs validated by the validation routine.

2. The mobile device of claim 1 wherein the validation routine includes:
    running a first query on a pre-trusted QR code database to determine if the pre-trusted QR code database stores the URL;
    in response to the first query identifying the URL in the pre-trusted QR code database, validating the URL;
    in response to the first query returning a null value, running a second query on a suspicious URL database to determine if the suspicious URL database stores the URL;

in response to the second query identifying the URL, failing to validate the URL; and in response to the second query failing to identify the URL, accessing a webpage identified by the URL in a sandbox environment.

3. The mobile device of claim 2 wherein the accessing the webpage in the sandbox environment includes searching the webpage, in the sandbox environment, for one or more scripting errors, requests for information, improper scripting and redirection commands.

4. The mobile device of claim 3 wherein the validation routine further comprises:

validating the URL in response to the sandbox environment failing to identify the one or more scripting errors, requests for information, improper scripting and redirection commands; and failing to validate the URL in response to the sandbox environment identifying at least one scripting error, requests for information, improper script and redirection command.

5. The mobile device of claim 1 wherein, after the transmitting of the image to the QR code reader, the OS is configured to trigger a web beacon to track browser activity on the mobile device for a time period.

6. The mobile device of claim 5 wherein the web beacon, when triggered, is configured to:

track browser activity on the mobile device to identify when the URL is accessed; and in response to identifying that the URL has been accessed, monitoring a website identified by the URL for anomalous behavior, the anomalous behavior including a request for access, a data request, and a redirect command.

7. The mobile device of claim 6 wherein the web beacon, when triggered, is configured to:

instruct the browser to shut down the URL in response to the monitoring identifying the anomalous behavior at the website; and automatically deactivate upon a lapse of the time period.

8. A system that applies root-level enforcement of quick response ("QR") code validation, the system comprising:

a QR code reader for:

receiving an instruction from a user to scan an image; and transmitting a request to an operating system ("OS") running on the system to instruct a camera to capture the image;

the OS for:

routing the request to the camera;

receiving the image from the camera;

running an image identification routine on the image to determine if the image includes a QR code;

in response to the image identification routine failing to identify a QR code, transmitting the image to the QR code reader;

in response to the image identification routine identifying a QR code, storing the image in a temporary cache; and transmitting the image to a QR code validator;

the QR code validator for:

in response to receipt of the image, decoding the identified QR code to identify a URL;

executing a validation routine to validate the URL;

in response to the validation routine validating the URL, transmitting a validation message including the URL to the OS; and in response to the validation routine failing to validate the URL, transmitting an error message to the OS;

the OS for transmitting the image to the QR code reader only in response to receipt of the validation message; and the QR code reader for, in response to receipt of the image from the OS, instructing a browser to access the URL;

wherein:

the transmitting of the image, by the OS, from the camera to the QR code validator and not the QR code reader ensures that the QR code reader will only instruct the browser to access URLs validated by the validation routine.

9. The system of claim 8 wherein the QR code reader is configured to decode QR codes and instruct a browser running on the system to access webpages identified in the QR codes.

10. The system of claim 8 wherein, in response to receipt of the validation message, the OS further transmits the URL to the QR code reader.

11. The system of claim 8 wherein the OS, in response to receipt of the error message, purges the image from the temporary cache and returns to the QR code reader a third message not including the image.

12. The system of claim 11 wherein the QR code reader, in response to receipt of the third message, displays an error message to the user.

13. One or more non-transitory computer-readable media storing computer-executable instructions which, when executed by a processor on a computer system, perform a method for root-level enforcement of quick response ("QR") code validation, the method comprising:

at a first interface comprising a QR code reader:

receiving an instruction from a user to scan a QR code; and transmitting a request to an operating system ("OS") running on the computer system to instruct a camera to capture an image including the QR code;

at the OS:

routing the request to the camera;

receiving the image from the camera;

storing the image in a temporary cache; and transmitting the image to a QR code validator;

at a second interface comprising the QR code validator:

in response to receipt of the image, decoding the QR code to identify a URL;

executing a validation routine to validate the URL;

in response to the validation routine validating the URL, transmitting a first message to the OS; and in response to the validation routine failing to validate the URL, transmitting a second message to the OS;

at the OS:

in response to receipt of the first message, retrieving the image from the temporary cache and transmitting the image to the QR code reader; and in response to receipt of the second message, purging the image from the temporary cache and returning to the QR code reader a third message not including the image; and at the first interface comprising the QR code reader:

in response to receipt of the image from the OS, decoding the QR code and instructing a browser to access the URL; and in response to receipt of the third message, displaying an error message to the user;

wherein:

the transmitting of the image, by the OS, from the camera to the QR code validator and not the QR code reader ensures that the QR code reader will only instruct the browser to access URLs validated by the validation routine.

14. The one or more non-transitory computer-readable media of claim 13 wherein the first interface is an application separate from the second interface and data accessible to the first interface is not accessible by the second interface.

15. The one or more non-transitory computer-readable media of claim 13 wherein the validation routine includes:
running a first query on a pre-trusted QR code database to determine if the pre-trusted QR code database stores the URL;
in response to the first query identifying the URL in the pre-trusted QR code database, validating the URL;
in response to the first query returning a null value, running a second query on a suspicious URL database to determine if the suspicious URL database stores the URL;
in response to the second query identifying the URL, failing to validate the URL; and
in response to the second query failing to identify the URL, accessing a webpage identified by the URL in a sandbox environment.

16. The one or more non-transitory computer-readable media of claim 15 wherein the accessing the webpage in the sandbox environment includes searching the webpage, in the sandbox environment, for one or more scripting errors, requests for information, improper scripting and redirection commands.

17. The method of claim 16 wherein the validation routine further comprises:
validating the URL in response to the sandbox environment failing to identify the one or more scripting errors, requests for information, improper scripting and redirection commands; and
failing to validate the URL in response to the sandbox environment identifying at least one scripting error, requests for information, improper script and redirection command.

18. The one or more non-transitory computer-readable media of claim 13 further comprising, after the transmitting of the image to the QR code reader, the OS triggering a web beacon to track browser activity on a mobile device for a time period.

* * * * *